(12) United States Patent
Goncalves et al.

(10) Patent No.: US 9,601,936 B2
(45) Date of Patent: Mar. 21, 2017

(54) BATTERY CHARGER REVERSE-BOOSTING DETECTION

(71) Applicant: QUALCOMM Incorporated, San Diego, CA (US)

(72) Inventors: Ricardo T Goncalves, Chandler, AZ (US); Jennifer A Hagstrom, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 890 days.

(21) Appl. No.: 13/852,706

(22) Filed: Mar. 28, 2013

(65) Prior Publication Data

US 2014/0210400 A1   Jul. 31, 2014

Related U.S. Application Data (60) Provisional application No. 61/758,638, filed on Jan. 30, 2013.

(51) Int. Cl.
*H02J 7/00* (2006.01)
*H02M 1/32* (2007.01)
*H02M 3/158* (2006.01)

(52) U.S. Cl.
CPC .......... *H02J 7/0052* (2013.01); *H02J 7/0029* (2013.01); *H02J 7/0065* (2013.01); *H02M 1/32* (2013.01); *H02M 3/1588* (2013.01); *H02J 2007/0037* (2013.01); *Y02B 40/90* (2013.01); *Y02B 70/1466* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 6,144,187 A | * | 11/2000 | Bryson | H02J 7/0068 320/137 |
| 6,246,215 B1 | * | 6/2001 | Popescu-Stanesti | H02J 7/0068 320/139 |
| 6,326,771 B1 | * | 12/2001 | Popescu-Stanesti | H02J 7/0068 320/139 |
| 7,262,585 B2 | | 8/2007 | May | |
| 2007/0096693 A1 | * | 5/2007 | Palczynski | H02J 7/0065 320/128 |
| 2007/0182366 A1 | | 8/2007 | Lee | |
| 2008/0052550 A1 | | 2/2008 | Ozawa et al. | |

(Continued)

OTHER PUBLICATIONS (XP-002735181), Jose Formenti and Robert Martinez, Design Trade-offs for Switch-Mode Battery Chargers, 2004.*

(Continued)

*Primary Examiner* — Yalkew Fantu
(74) *Attorney, Agent, or Firm* — Arent Fox LLP (57) ABSTRACT

Exemplary embodiments are related to detecting a reverse-boosting operation of a battery charger. A device may include a plurality of switches for receiving an input voltage at an input port and conveying an output voltage. The device may also include a first sensing device coupled to the input port configured to detect if an input current is less than a threshold current. Further, the device may include a second sensing device selectively coupled to the input port to detect if the input voltage is less than a threshold voltage.

20 Claims, 10 Drawing Sheets

(56) References Cited

U.S. PATENT DOCUMENTS

| | | | | |
|---|---|---|---|---|
| 2008/0238362 A1* | 10/2008 | Pinnell | .................... | H02J 7/042 |
| | | | | 320/107 |
| 2009/0108677 A1 | 4/2009 | Walter et al. | | |
| 2012/0287685 A1 | 11/2012 | Fahlenkamp | | |
| 2013/0018597 A1* | 1/2013 | Gofman | ................ | A61B 5/145 |
| | | | | 702/23 |

OTHER PUBLICATIONS

Formenti J., et al., "Design Trade-offs for Switch-Mode Battery Chargers," Jan. 1, 2004 (Jan. 1, 2004), XP002735181, 17 pages, Retrieved from the Internet < URL: http://www.ti.com/lit/ml/slyp089/slypo89.pdf > [Retrieved on Jan. 29, 2015], p. 9-p. 10.

International Search Report and Written Opinion—PCT/US2014/012820—ISA/EPO—Feb. 13, 2015.

Texas Instruments Incorporated: "Stand-Alone Synchronous Switch-Mode Li-Ion or Li-Polymer Battery Charger with System Power Selector and Low Iq," Dec. 1, 2009 (Dec. 1, 2009), 33 pages, XP002735180, Retrieved from the Internet < URL: http://www.alldatasheet.com/datasheet-pdf/pdf/317215/TI/BQ24610.html [retrieved on Jan. 29, 2015] the whole document.

Linear Technology Corporation, "Linear USB Battery Charger with Buck and Buck-Boost Regulators," LTC3558, 2010, pp. 1-32, <URL: http://cds.linear.com/docs/en/datasheet/3558.pdf>.

* cited by examiner

BATTERY CHARGER REVERSE-BOOSTING DETECTION

CLAIM OF PRIORITY UNDER 35 U.S.C. §119

The present Application for patent claims priority to Provisional Application No. 61/758,638, entitled "SWITCHING CHARGERS UNINTENDED-REVERSE-BOOSTING DETECTION UPON INPUT POWER SUPPLY REMOVAL" filed Jan. 30, 2013, and assigned to the assignee hereof and hereby expressly incorporated by reference herein.

BACKGROUND

Field

The present invention relates generally to battery chargers. More specifically, the present invention relates to embodiments for automatically detecting a reverse-boosting operation in a switching battery charger upon removal of an input power supply.

Background

An electronic device, such as a mobile telephone, may include a battery charger that receives an input voltage from a power supply and generates an output voltage, which may received by a load and/or a battery. Battery chargers that use a switch-mode architecture employ a switching circuit to provide buck conversion of an input power supply (e.g., a wall adapter) to charge a battery, or a boost conversion of a battery to the input node where the input power supply is connected (e.g., on-the-go (OTG) feature).

A battery charger that uses a switch-mode architecture can boost an output voltage at an output node, where a battery or other power supplying device is currently connected to, back to an input node when an input power supply is removed from the input node. The battery charger may stay stuck in this undesirable state because it cannot distinguish that the input power supply (e.g., wall adapter) has been removed.

A need exists for an enhanced battery charger. More specifically, a need exists for embodiments related to detecting a reverse-boosting operation of a battery charger upon removal of a input power supply.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

During normal operation of an electronic device (e.g., a mobile telephone), a switch-mode battery charger, which is based on a power converter topology (e.g., a buck converter topology), may transfer energy from an input power supply to a battery and/or one or more other components of the electronic device. When the input power supply is removed from an input node of the battery charger, the battery may be the only source of energy for the electronic device. As will be appreciated by a person having ordinary skill in the art, upon removal of the input power supply from the input node, the battery charger may behave as a "boost switcher" and, therefore, prevent a voltage at the input node from collapsing. Accordingly, the electronic device may not be able to detect the removal of the input power supply (e.g., the electronic device may misinterpret the removal of the input power supply as a "weak" input power supply) and, thus, the battery charger will not be disabled.

When an input power supply (e.g., a DC or USB input power supply) is utilized to charge a battery, a battery charger is operating in a buck (i.e., step-down) mode. When a duty-cycle reaches very high levels due to a combination of input voltage collapse (e.g., the power supply cable impedance may cause an IR-drop) and a nearly fully charged battery, it is possible to cause the battery charging circuit to incorrectly operate in reverse-boosting mode after the input power supply is removed (i.e., decoupled from an input node of the battery charger). The primary cause of this behavior is negative inductor current being supplied from the battery during low-side pulses. Once this happens, there may be a voltage on the input node of the battery charging circuit that is proportional to the battery voltage and boost-mode duty-cycle. This "boosting-back" after input removal problem is very difficult to solve because: the buck converter cannot reach 100% duty-cycle (e.g., due to high-side NFET topology), which would typically stop switching operation as the input voltage collapses; the input voltage may not collapse, making it hard to detect using a threshold; and it may be difficult to accurately detect exactly when the inductor current reaches zero (i.e., before it turns negative), due to inherent offset and delay of the zero detection comparator and circuitry.

Unintended reverse-boosting can be triggered upon removal of an input power supply as long as an inductor current is allowed to build negatively. In one scenario, a battery charger may attempt regulate an input voltage when the input power supply is removed. The mechanism of control may include limiting the duty-cycle (i.e., turning a low-side FET ON for longer time, thus increasing the duty-cycle when the battery charger is operating as booster). The inductor current grows more negative and the booster becomes "stronger" being able to supply some amount of current in fact. In another scenario, a battery charger, which does not regulate the input voltage, and are implemented with N-Channel FETs are required to turn the low-side FET ON every cycle (even if for short time) to charge bootstrap cap (the high-side FET supply voltage). Very similar effect the scenario described above, however, the booster will operate with a fixed duty-cycle (i.e., given by the time the low-side FET is ON).

As will be appreciated by a person having ordinary skill in the art, negative inductor current is essential in causing a switching battery to operate in a reverse-boosting mode when the input power supply is removed. Several factors may contribute (e.g., blanking time (to filter switching noise), zero crossing comparator inaccuracy and propagation delay).

Figure 1:
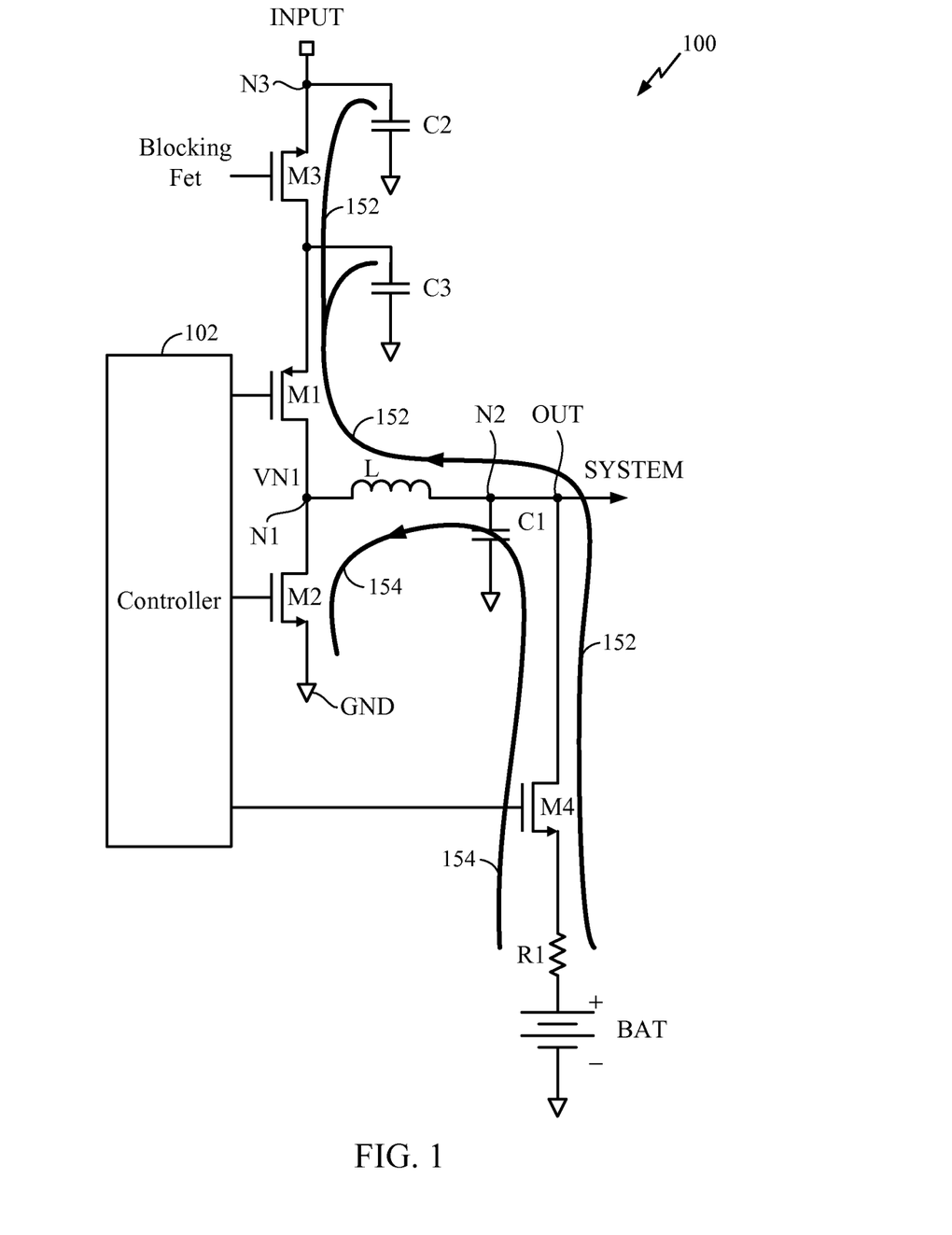
FIG. 1 illustrates a battery charger including a switch-mode architecture and inductor currents during a reverse-boosting operation.

FIG. 1 depicts a switch-mode battery charger 100. Switch-mode battery charger 100 includes a controller (e.g., buck controller) 102 coupled to each of a high-side field effect transistor (FET) M1 and a low-side FET M2. More specifically, controller 102 may be coupled to a gate of high side FET M1 and a gate of low-side FET M2. Each of a drain of high-side FET M1 and a drain of low-side FET M2 may be coupled to a node N1, which may be coupled to an inductor L. A source of low-side FET M2 may be coupled to a ground voltage GRND. Inductor L may be further coupled to a node N2, which is further coupled to an output port OUT. Switch mode battery charger 100 may also include a capacitor C1 coupled between node N2 and ground voltage GRND.

Additionally, switch-mode battery charger 100 includes a blocking FET M3. A source of blocking FET M3 may be coupled to an input node (i.e., an input port) N3, which is further coupled to a ground voltage GRND via a capacitor C2. A drain of blocking FET M3 may be coupled to a source of high-side FET M1 and a capacitor C3, which is further coupled to ground voltage GRND. Switch-mode battery charger 100 may also include a battery FET M4 having a gate coupled to controller 102 and a drain coupled to output port OUT. Battery FET M4 further includes a source coupled to a battery BAT via a resistor R1. It is noted that resistor R1 may comprise a battery pack resistance (i.e., a resistance internal to battery BAT). Battery BAT may be coupled between resistor R1 and ground voltage GRND. The term "battery" may refer to a single cell configuration or a multiple cell stack configuration (e.g., a 2S configuration, which comprises 2 series-connected cells). Further, it is noted that the FETs, as described herein, may be also be referred to as "switches" or "switching elements."

Figure 2:
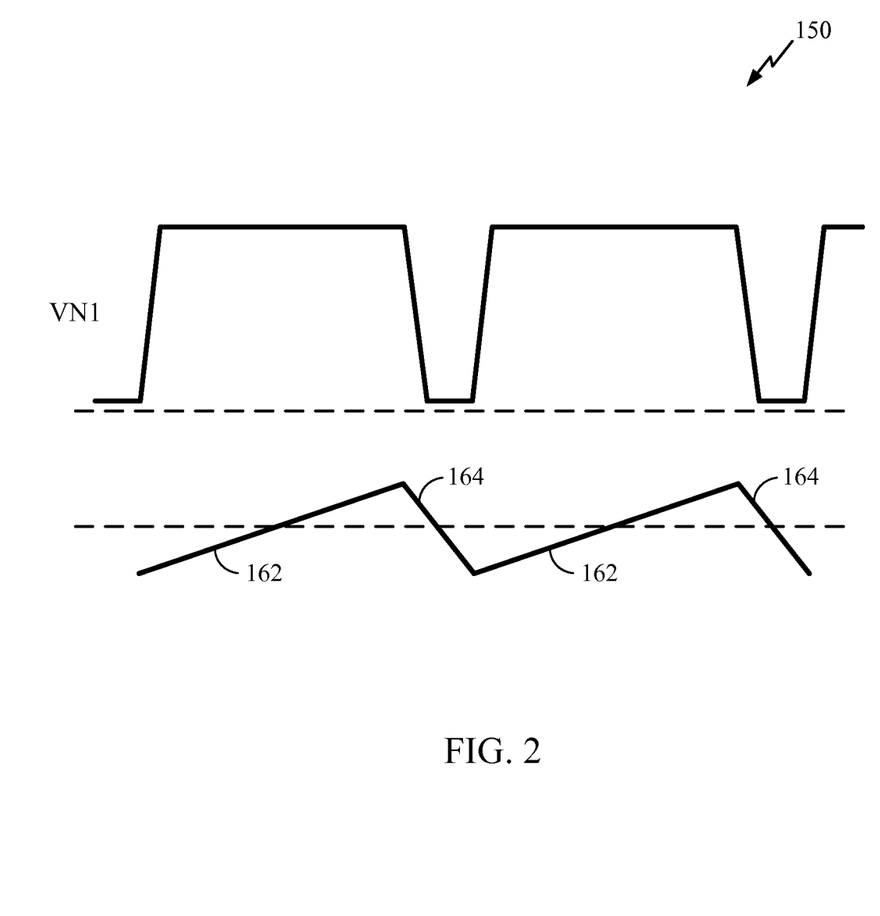
FIG. 2 is a plot illustrating various signals of a battery charger including a switch-mode architecture during a reverse-boosting operation.

Further, FIG. 1 illustrates inductor currents of switch-mode battery charger 100 during a reverse-boosting operation. With reference to switch-mode battery charger 100 of FIG. 1, during a first mode of a reverse-boosting operation (i.e., while high-side FET M1 is in a conductive state and low-side FET M2 is non-conductive state), an inductor current, as illustrated by reference numeral 152 in FIG. 1, may flow from battery BAT to capacitors C2 and C3 via high-side FET M1. FIG. 2 is a plot 150 depicting an inductor current (i.e., the current flowing through inductor L) and a voltage at node N1 (i.e., VN1) during a reverse-boosting operation. As illustrated in FIG. 2, during the first mode of operation, voltage VN1 increases and the inductor current, which is represented by reference numeral 162, transitions from a negative inductor current to a positive inductor current.

With reference again to FIG. 2, during a second mode of a reverse-boosting operation (i.e., while high-side FET M1 is in a non-conductive state and low-side FET M2 is a conductive state), an inductor current, as illustrated by reference numeral 154, may flow from battery BAT to ground voltage GRND via low-side FET M2. Further, as illustrated in FIG. 2, during the second mode of operation, voltage VN1 decreases and the inductor current, which is represented by reference numeral 164, transitions from a positive inductor current to a negative inductor current.

One method of detecting removal of an input power supply includes monitoring an input voltage of a battery charger and disabling (i.e., turning off) the battery charger when the input voltage drops below a threshold voltage. However, as noted above, boost-switching may prevent a voltage at the input node from collapsing. Further, other methods use software to periodically check battery management system (BMS) circuitry for negative current. However, these methods may not work when a battery voltage is high (e.g., 4.35 volts or more).

Exemplary embodiments, as described herein, are directed to devices, systems, and methods for detecting a reverse-boosting operation upon removal of an input power supply from a battery charger. According to one exemplary embodiment, a device may include a plurality of switches for receiving an input voltage at an input port. The device may include a first sensing device coupled to the input port configured to detect if an input current is less than a threshold current. Further, the device may include a second sensing device selectively coupled to the input port to detect if the input voltage is less than a threshold voltage. The device may be disabled if the input current is less than the threshold current and the input voltage is less than a threshold voltage.

According to another exemplary embodiment, a device may include a battery charger coupled to a control module. The battery charger may include an input port for coupling to an input power supply and a plurality of switches for receiving an input voltage via the input port. The battery charger may further include a first sensing device coupled to the input port and configured to convey a first signal indicative of a comparison of an input current and a threshold current. The battery charger may also include a second sensing device selectively coupled to the input port and configured to convey a second signal indicative of a comparison of the input voltage and a threshold voltage. The control module may configured to receive the first signal and the second signal and convey a control signal for disabling the battery charger in response to the input voltage being less than the threshold voltage and the input current being less than the threshold current.

According to another exemplary embodiment, the present invention includes methods for detecting a reverse-boosting condition upon removal of power supply from a battery charger. Various embodiments of such a method may include comparing an input current level of a battery charger to a threshold current and comparing an input voltage level of the battery charger to a threshold voltage. The method may further include disabling the battery charger if the input current level is less than a threshold current and the input voltage level is less than a threshold voltage.

Other aspects, as well as features and advantages of various aspects, of the present invention will become apparent to those of skill in the art though consideration of the ensuing description, the accompanying drawings and the appended claims.

Figure 3:
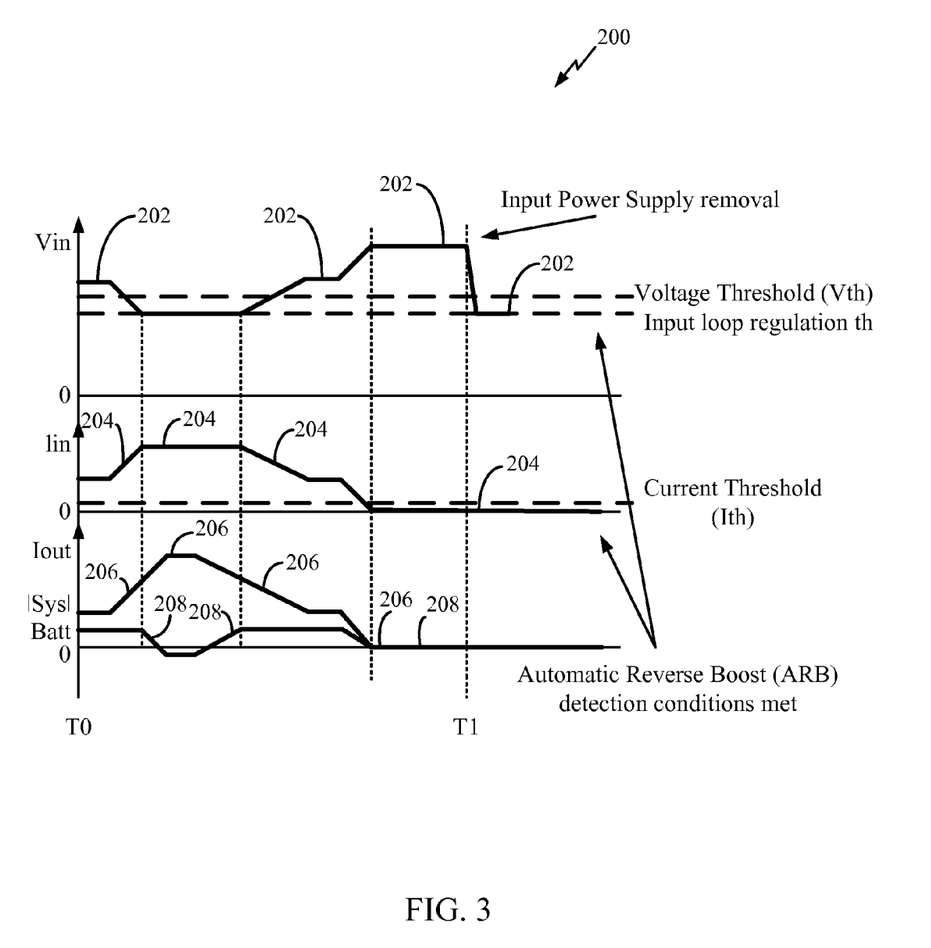
FIG. 3 is a plot illustrating various signal levels of a battery charger during operation.

FIG. 3 is a plot 200 illustrating various signal levels of a battery charger during operation. More specifically, a signal 202 depicts an input voltage (e.g., a voltage at node N3 of FIG. 1) and signal 204 represents an input current (e.g., a current through node N3 of FIG. 1). Moreover, signal 206 represents an output current supplied to a load and signal 208 represents an output current supplied to a battery (e.g., battery BAT of FIG. 1). It is noted that between time T0 and T1, a "weak" input power supply is coupled to the battery charger. Further, at time T1, the input power supply is removed (i.e., decoupled from the battery charger). As illustrated in plot 200, at time T1 (i.e., upon removal of the input power supply), the input voltage, which is represented by signal 202 decreases below a voltage threshold Vth. Further, at time T1, the input current, which is represented by signal 204, decreases below a threshold current Ith.

Low average input current of a battery charger is one of the characteristics of reverse-boosting. However, in normal operation, when an input supply is plugged in and a battery is nearly fully charged, the input current may be low. An input voltage level of the battery charger may also define an operating state. A "weak" input power supply may pull its output voltage to a nominal value under low load conditions, higher than a reference voltage. It is noted that the reference voltage may be selected to be lower than a minimum voltage of the input power supply at no load and higher than the maximum voltage at the input node at unintended reverse-boosting. By way of example only, the reference voltage may comprise 4.35 volts. Alternatively, reverse-boosting may regulate the input voltage to an input voltage regulation setting (e.g., 4.35 volts) or the boost will be switching at a minimum duty-cycle (i.e., low-side FET minimum ON time given by a maximum duty cycle). Therefore, in accordance with various exemplary embodiments of the present invention, an input current and an input voltage may be monitored, in real time, to detect a reverse-boost condition upon removal of an input power supply.

Figure 4:
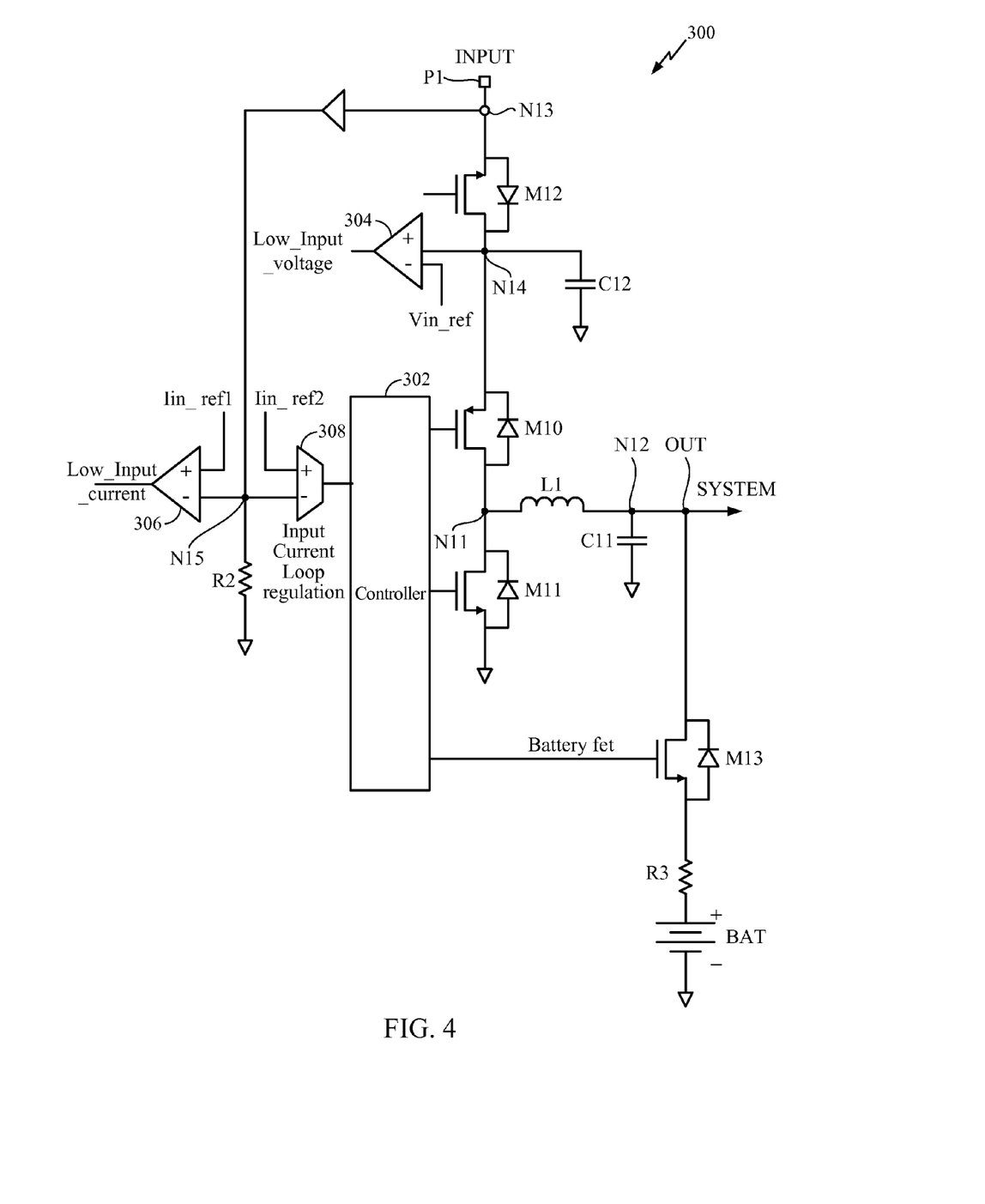
FIG. 4 depicts a battery charger including a switch-mode architecture, according to an exemplary embodiment of the present invention.

FIG. 4 illustrates a device 300, in accordance with an exemplary embodiment of the present invention. Device 300, which may comprise a battery charger, includes switch-mode architecture and is configured to receive an input voltage from an input power supply and generate an output voltage, which may received by a load and/or a battery.

Device 300 includes a controller (e.g., buck controller) 302 coupled to each of a high-side field-effect transistor (FET) M10 and low-side FET M11. More specifically, controller 302 may be coupled to a gate of high-side FET M10 and a gate of low-side FET M11. Each of a drain of high-side FET M10 and a drain of low-side FET M11 may be coupled to a node N11, which may be coupled to an inductor L1. A source of low-side FET M11 may be coupled to a ground voltage GRND. Inductor L1 may be further coupled to a node N12, which is further coupled to output node OUT. Device 300 may also include a capacitor C11 coupled between node N12 and ground voltage GRND.

Additionally, device 300 includes a blocking FET M12. A source of blocking FET M12 may be coupled to an input node N13 and a drain of blocking FET M12 may be coupled to a node N14, which is further coupled to ground voltage GRND via a capacitor C12. Node N14 is further coupled to one input of a voltage comparator 304. More specifically, node N14 may be coupled to an inverting input of voltage comparator 304. Voltage comparator 304 may also be configured to receive a reference voltage Vin_ref (e.g., at a non-inverting input). As noted above, reference voltage Vin_ref may be selected to be lower than a minimum voltage of the input power supply at no load and higher than the maximum voltage at the input node at unintended reverse-boosting. For example only, reference voltage Vin_ref may comprise a voltage of substantially 4.35 volts.

Input node N13, which may also be referred to as an "input port," is further coupled to a node N15, which is coupled to a current comparator 306, a loop regulation unit 308, and ground voltage GRND via a resistor R2. More specifically, node N15 may be coupled to an inverting input of current comparator 306 and an inverting input of loop regulation unit 308. Current comparator 306 may also be configured to receive a reference current Iin_ref1 (e.g., at a non-inverting input). Reference current may comprise any current value. As one example, reference current Iin_ref1 may comprise a current of 50 milliamps. As another example, reference current Iin_ref1 may comprise a current of zero milliamps. It is noted that the input current replica used by current comparator 306 may also be used by loop regulation unit 308 for input current loop regulation. It is further noted that voltage comparator 304 and current comparator 306 may each be referred to as a "sensing device."

Device 300 may also include a battery FET M13 having a gate coupled to controller 302 and a drain coupled to output node OUT. Battery FET M4 further includes a source coupled to battery BAT via a resistor R3. Battery BAT may be coupled between resistor R3 and ground voltage GRND. It is noted that resistor R3 may comprise a battery pack resistance (i.e., a resistance internal to battery BAT).

A contemplated operation of device 300 will now be described. While an input power supply is coupled to input node N13, during a first mode of operation, each of FETs M12, M10, and M13 may be in a conductive state, FET M11 may be in a non-conductive state, and capacitor C11 may be charged via the input power supply. During another, second mode of operation, each of FETs M12 and M10 may be in a non-conductive state, each of FETs M11 and M13 may be in a conductive state, and an output voltage may be conveyed to a load, and possibly battery BAT, via output node OUT.

Upon removal of the input power supply (i.e., decoupling input node N13 from an input power supply), a reverse-boosting operation may occur wherein during the first mode of operation (i.e., while high-side FET M10 is in a conductive state and low-side FET M11 is non-conductive state), an inductor current may flow from battery BAT to capacitor C12 via high-side FET M10. Further, during a second mode of operation (i.e., while high-side FET M10 is in a non-conductive state and low-side FET M11 is a conductive state), an inductor current may flow from battery BAT to ground voltage GRND via low-side FET M11.

Further, it is noted that anytime during operation (i.e., during normal boosting operation or reverse-boosting operation) comparator 304 may convey a signal indicative of a relationship between the input voltage (i.e., at node N14) and reference voltage Vin_ref, and comparator 306 may convey a signal indicative of a relationship between the input current (i.e., the current through node N15) and reference voltage Iin_ref.

Figure 5:
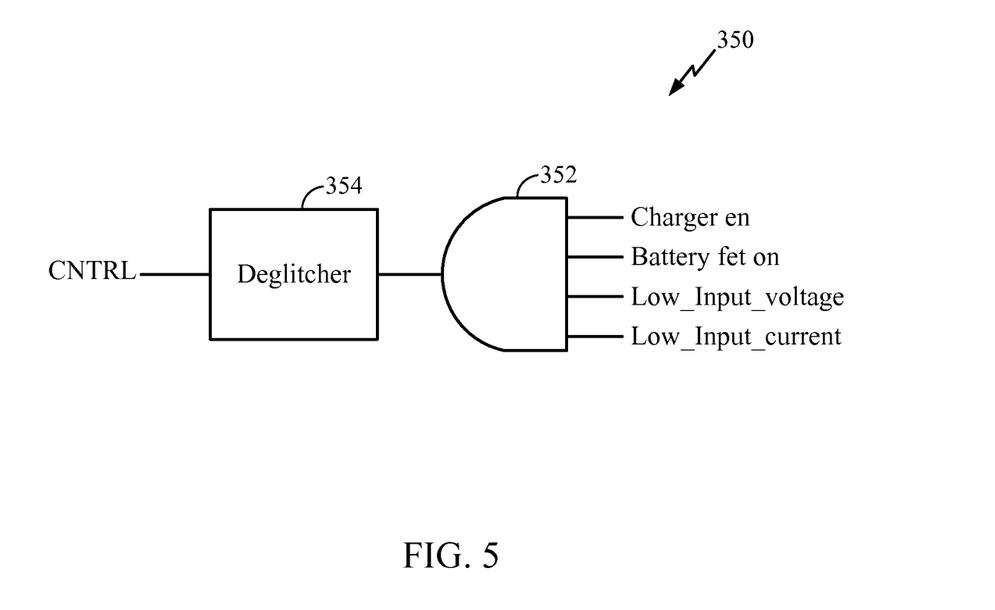
FIG. 5 depicts a device for detecting a reverse-boosting operation of a battery charger, in accordance with an exemplary embodiment of the present invention.

FIG. 5 depicts a device 350 for detecting a reverse-boosting operation and disabling a device (e.g., a battery charger) in response thereto, in accordance with an exemplary embodiment of the present invention. Device 350 includes an AND gate 352 configured to receive a plurality of input signals, such as a "Low_Input_voltage," which is an output of voltage comparator 304 (see FIG. 4), and a "Low_Input_current," which is an output of current comparator 306 (see FIG. 4). More specifically, signal Low_Input_current may indicate whether the input current of device 300 is less than or equal to a current threshold. Further, signal Low_Input_voltage may indicate whether the input voltage of device 300 is less than or equal to a voltage threshold. AND gate 350 may also receive a signal Battery_Fet_On, which indicates a state of battery FET M13 (see FIG. 4), and a signal Charger_enable, which indicates whether device 300 is enabled or disabled.

Device 350 may also include a deglitcher 354 configured to receive an output of AND gate 352 and convey a control signal CNTRL, which may disable device 300 (i.e., turn off device 300).

During a contemplated operation, if each signal received by AND gate 352 is asserted (e.g., "high"), AND gate 352 may convey a "high" signal to deglitcher 354. Upon receiving a "high" signal from AND gate 352, deglitcher 354 may initiate a time delay (e.g., a 10 ms time delay). If, upon expiration of the time delay, deglitcher 354 is still receiving a "high" signal from AND gate 352, deglitcher 354 may convey control signal CNTRL to disable device 300.

It is noted that although AND gate 352 is illustrated as receiving four input signals, the present invention is not so limited. Rather, AND gate 352 may be configured to receive any number of signals, which may be used for disabling device 300. As an example, AND gate 352 may only receive signal Low_Input_voltage, which is the output of voltage comparator 304 (see FIG. 4), and signal Low_Input_voltage, which is the output of voltage comparator 304 (see FIG. 4). In this example, in response to receiving signal Low_Input_voltage and signal Low_Input_voltage indicating that the input current and the input voltage of device 300 are each less than respective threshold values, AND gate 352 may convey a "high" signal to deglitcher 354, which may, after a time delay, convey control signal CNTRL to disable device 300.

Figure 6:
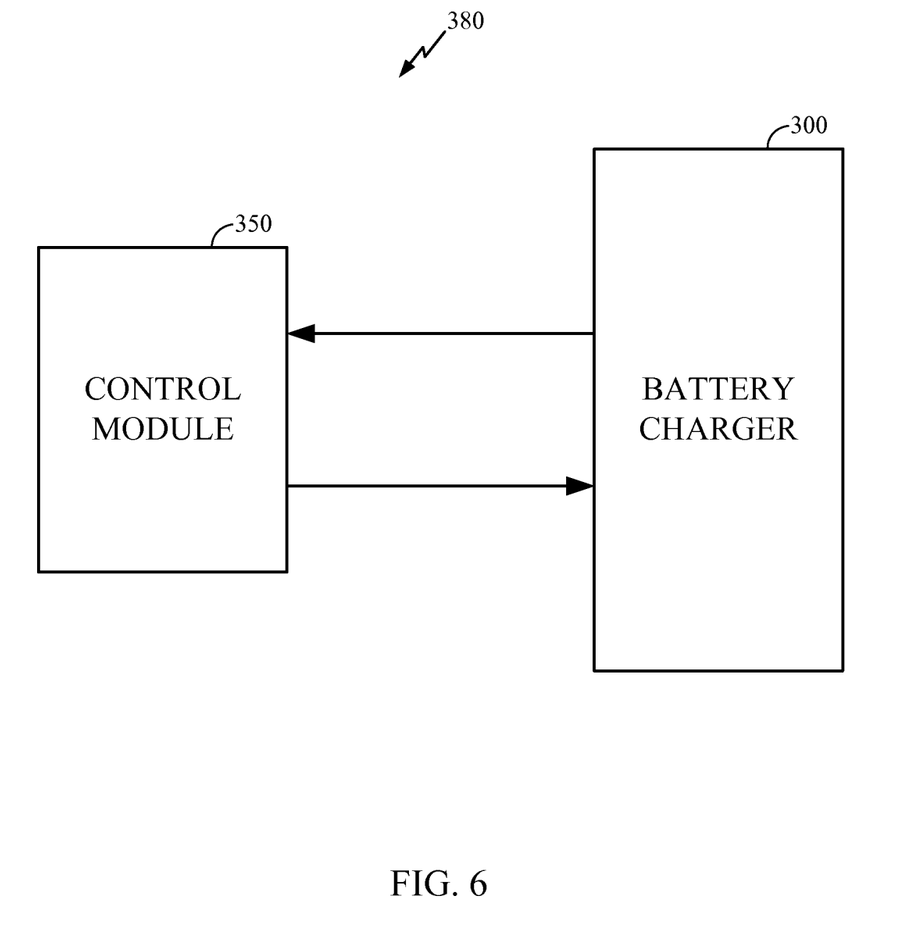
FIG. 6 is a block diagram of a device including a battery charger, according to an exemplary embodiment of the present invention.

FIG. 6 is a block diagram of a device 380 including device 300 (see FIG. 4) coupled to device 350 (see FIG. 5). It is noted that device 300 may be configured to convey one or more signal to device 350. More specifically, an output of comparator 304 and an output of comparator 306 may be conveyed from device 300 to device 350. Furthermore, signals indicative of a state of battery FET M13 (i.e., "Battery fet on") and a state of device 300 (i.e., "Charger en") may be conveyed to device 350. Moreover, device 350 may convey one or more signals to device 300. As an example, a control signal (i.e., control signal CNTRL) may be conveyed from device 350 to device 300 for disabling device 300.

Figure 7:
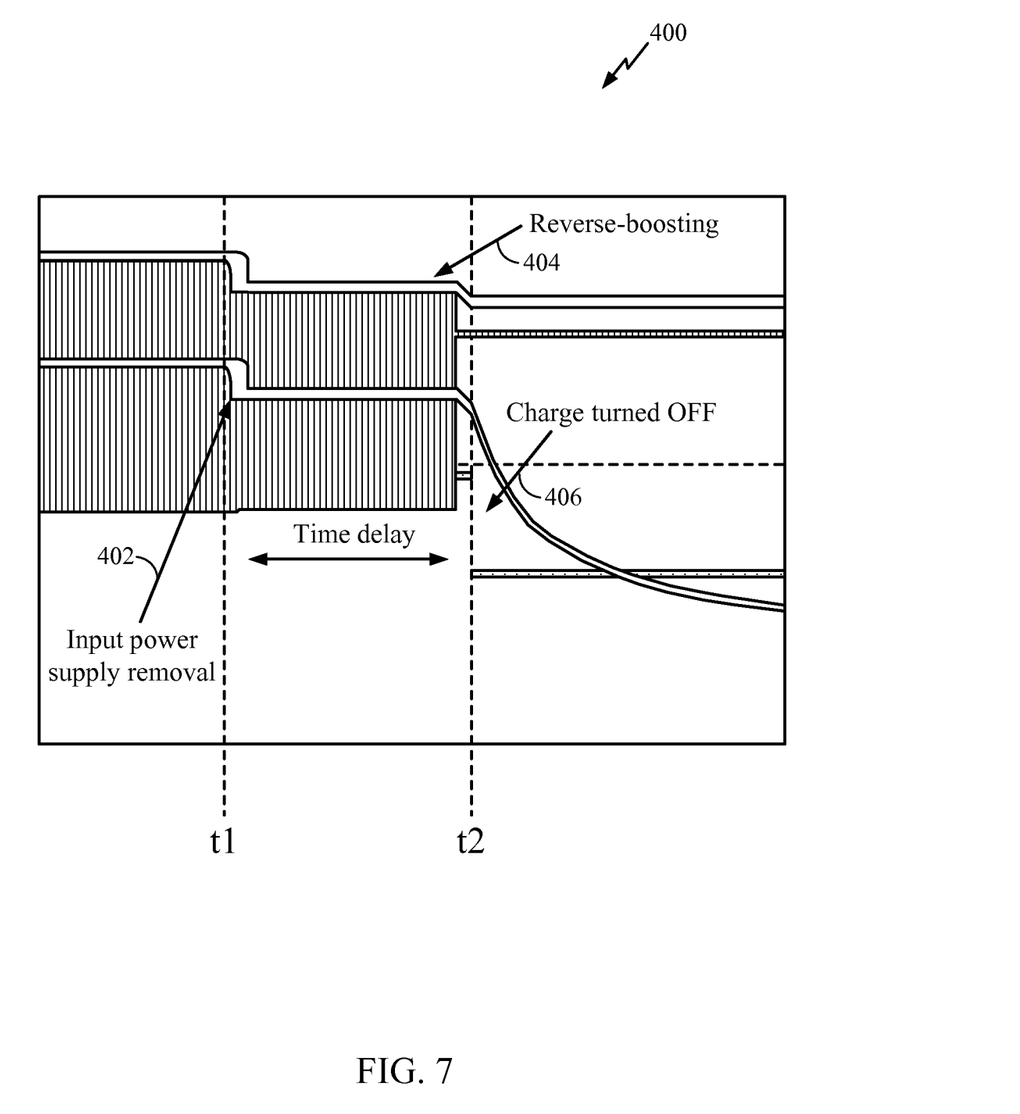
FIG. 7 is a plot depicting various events associated with a battery charger upon removal of an input power source.

FIG. 7 is a plot 400 depicting various events associated with a battery charger (e.g., battery charger 300), in accordance with an exemplary embodiment of the present invention. Waveform 402 of plot 400 depicts an input power supply removal event at a time t1 (e.g., removal of an input power supply at node N13 of FIG. 4) and waveform 404 depicts a reverse-boosting event at time t1 (e.g., at node N14 of FIG. 4). Further, waveform 406 depicts an event wherein a charger is turned off (i.e., disabled via control signal CNTRL of FIG. 6). As illustrated in plot 400, a time delay (e.g., 10 ms) may be exist between time t1 (i.e., detecting a reverse-boosting operation) and time t2 (i.e., disabling the battery charger).

Figure 8:
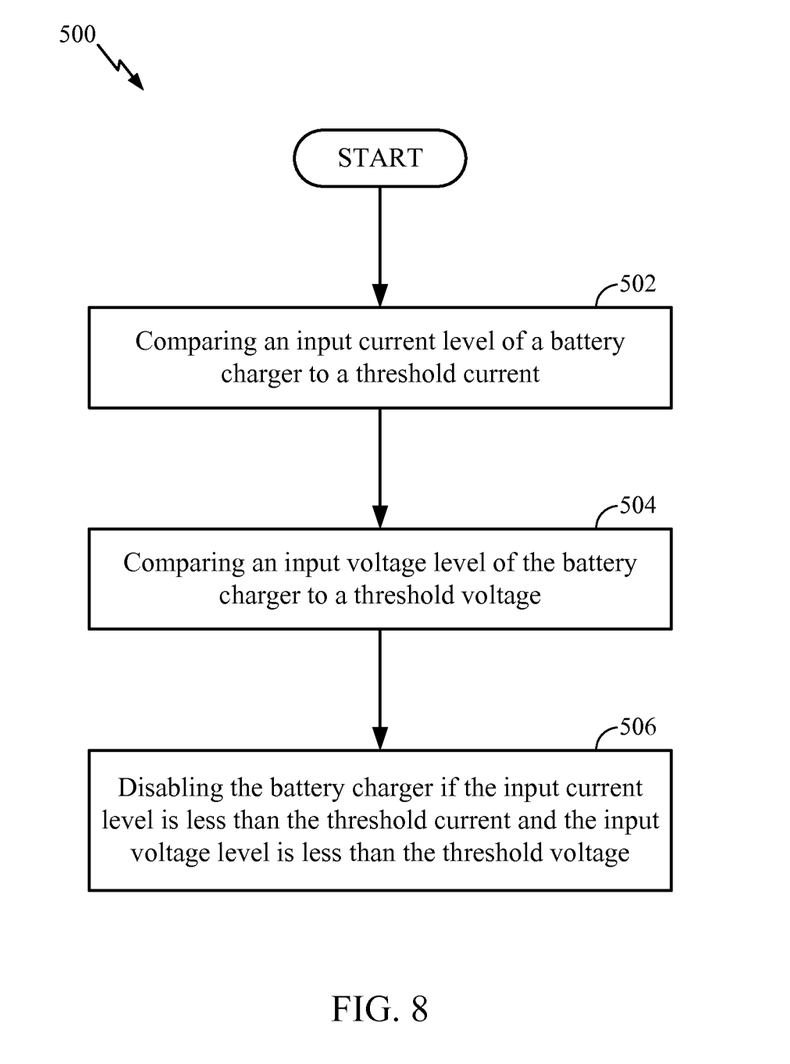
FIG. 8 is a flowchart illustrating a method, according to an exemplary embodiment of the present invention.

FIG. 8 is a flowchart illustrating a method 500, in accordance with one or more exemplary embodiments. Method 500 may include comparing an input current level of a battery charger to a threshold current (depicted by numeral 502). Method 800 may also include comparing an input voltage level of the battery charger to a threshold voltage (depicted by numeral 504). Further, method 800 may include disabling the battery charger if the input current level is less than the threshold current and the input voltage level is less than the threshold voltage (depicted by numeral 506).

Figure 9:
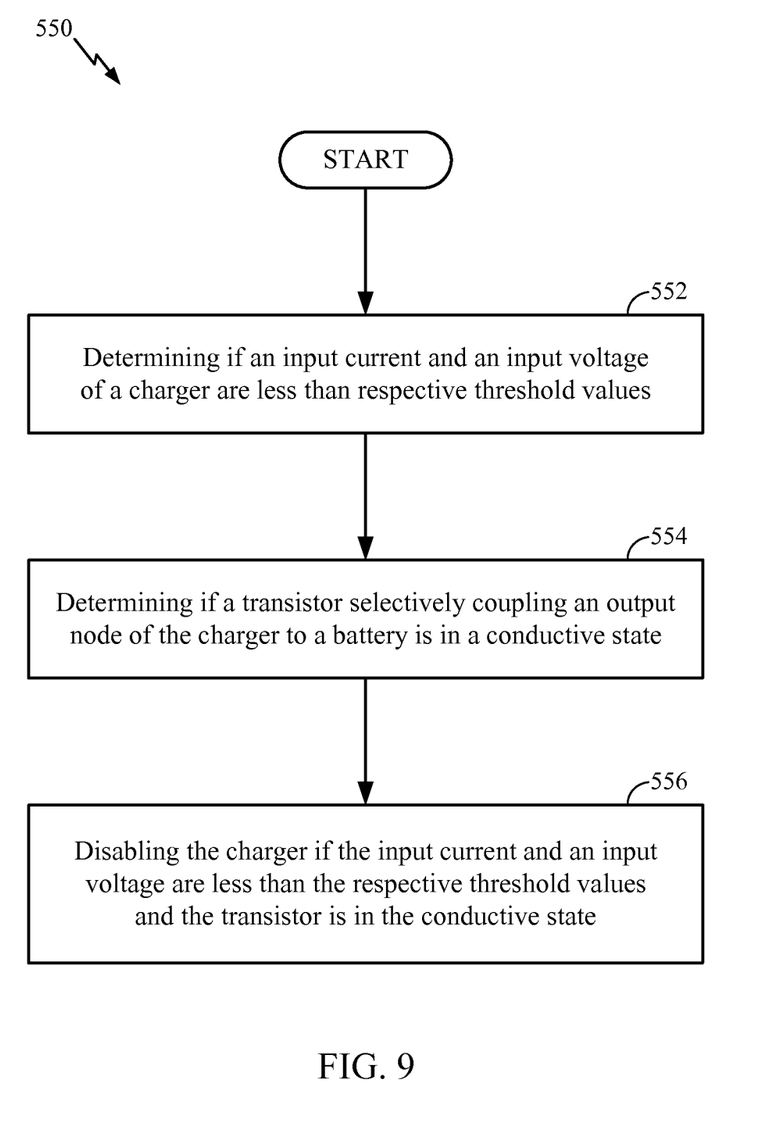
FIG. 9 is a flowchart illustrating another method, according to an exemplary embodiment of the present invention.

FIG. 9 is a flowchart illustrating a method 550, in accordance with one or more exemplary embodiments. Method 550 may include determining if an input current and an input voltage of a charger are less than respective threshold values (depicted by numeral 552). Method 550 may also include determining if a transistor selectively coupling an output node of the charger to a battery is in a conductive state (depicted by numeral 554). In addition, method 550 may include disabling the charger if the input current and an input voltage are less than the respective threshold values and the transistor is in the conductive state (depicted by numeral 556).

Figure 10:
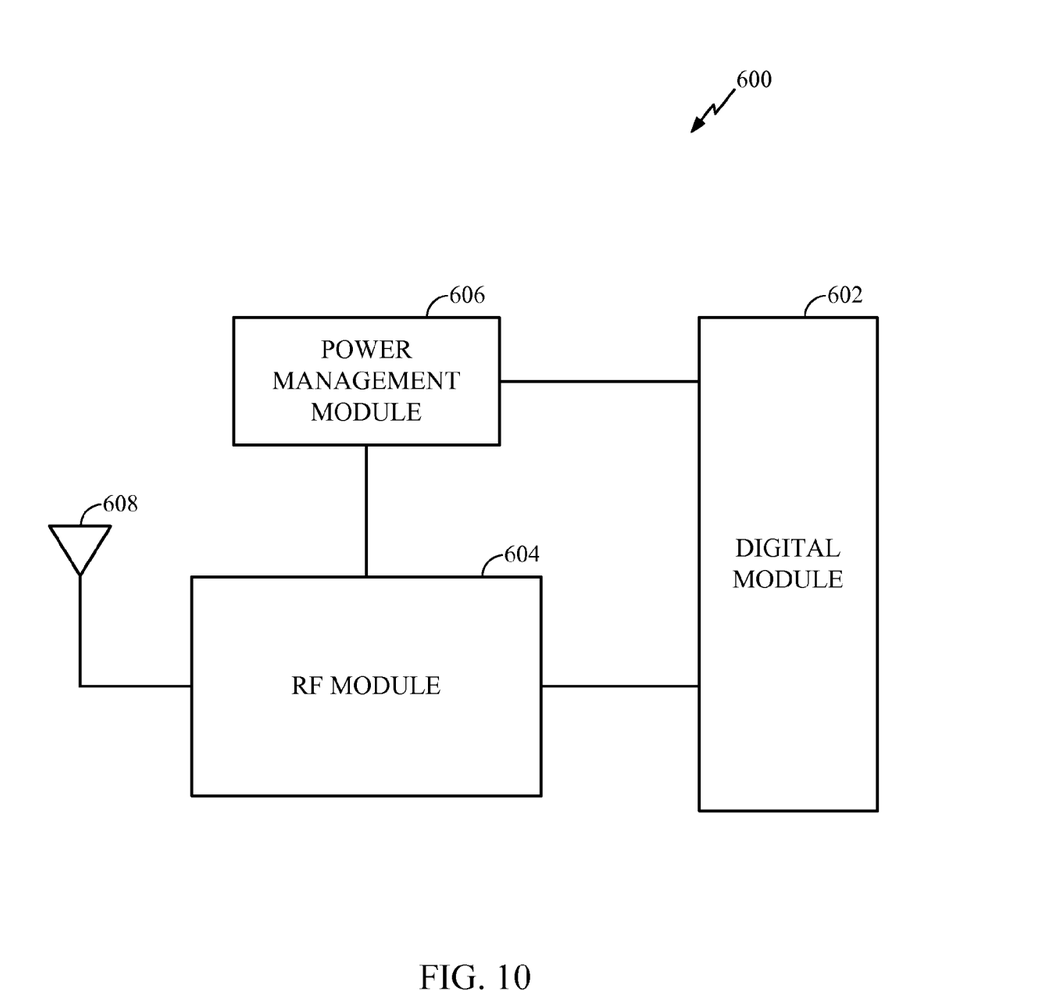
FIG. 10 illustrates a wireless communication device, in accordance with an exemplary embodiment of the present invention.

FIG. 10 is a block diagram of a wireless communication device 600. In this exemplary design, wireless communication device 600 includes digital module 602, an RF module 604, and power management module 606. Digital module 602 may comprise memory and one or more processors. RF module 604, which may comprise a radio-frequency integrated circuit (RFIC) may include a transceiver including a transmitter and a receiver and may be configured for bi-directional wireless communication via an antenna 608. In general, wireless communication device 600 may include any number of transmitters and any number of receivers for any number of communication systems, any number of frequency bands, and any number of antennas. Further, power management module 606 may include one or more battery charging devices, such as device 380 illustrated in FIG. 6.

As described herein, exemplary embodiments of the present invention include a device configured to continuously monitor an input current and an input voltage of a battery charger. An operation state of a battery FET may also be monitored. Further, the battery charger may be disabled when all conditions (i.e., a low input current, a low input voltage, and the battery FET is in a conductive state) are true and stable. The present invention may distinguish between a reverse-boosting operation and a "weak" input power supply. Further, the present does not require any software interaction and there is no need to stop normal operation to detect reverse-boosting.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for detecting a reverse-boosting operation upon removal of an input power supply from a battery charger, comprising:
   a plurality of switches for receiving an input voltage at an input port and conveying an output voltage;
   a first sensing device coupled to the input port configured to detect if an input current is less than a threshold current;
   a second sensing device selectively coupled to the input port to detect if the input voltage is less than a threshold voltage; and
   a control module coupled to an output of each of the first sensing device and the second sensing device and configured to disable the device if the input current is less than the threshold current and the input voltage is less than the threshold voltage.

2. The device of claim 1, the first sensing device comprising a comparator having an inverting input coupled to the input port and configured to convey a signal indicative of the input current being less than the threshold current.

3. The device of claim 1, the second sensing device comprising a comparator having an inverting input selectively coupled to the input port and configured to convey a signal indicative of the input voltage being less than the threshold voltage.

4. The device of claim 1, the threshold current having a value of 50 milliamps.

5. The device of claim 1, the threshold voltage having a value of 4.35 volts.

6. The device of claim 1, further comprising another switch configured to selectively convey the output voltage to a battery.

7. The device of claim 1, the control module comprising:
   an AND gate coupled to an output of each of the first sensing device and the second sensing device; and
   a deglitcher coupled to an output of the AND gate.

8. The device of claim 1, wherein the threshold voltage is selected to be lower than a minimum voltage of the input power supply at no load.

9. A device for detecting a reverse-boosting operation upon removal of an input power supply from a battery charger, comprising:
   the battery charger, comprising;
      an input port for coupling to a power source;
      a plurality of switches for receiving coupled to the input port;
      a first sensing device coupled to the input port and configured to convey a first signal indicative of a comparison of a current through the input port and a threshold current; and
      a second sensing device selectively coupled to the input port and configured to convey a second signal indicative of a comparison of a voltage at the input port and a threshold voltage; and
      a control module coupled to an output of each of the first sensing device and the second sensing device and configured to receive the first signal and the second signal, the control module further configured to convey a control signal for disabling the battery charger in response to the voltage at the input port being less than the threshold voltage and the current through the input port being less than the threshold current.

10. The device of claim 9, the control module further configured to receive a third signal indicative of an operational state of another switch selectively configured to couple an output of the battery charger to a battery.

11. The device of claim 9, the control module further configured to receive a third signal indicative of an operational state of the battery charger.

12. The device of claim 9, the control module configured to initiate a time delay in response to voltage at the input port being less than the threshold voltage and the current through the input port being less than the threshold current and prior to disabling the battery charger.

13. A method of detecting a reverse-boosting operation upon removal of an input power supply from a battery charger, comprising:
    comparing an input current level of the battery charger to a threshold current;
    comparing an input voltage level of the battery charger to a threshold voltage; and
    disabling the battery charger if the input current level is less than the threshold current and the input voltage level is less than the threshold voltage.

14. The method of claim 13, further comprising detecting the reverse-boosting operation if the input current level is less than a threshold current and the input voltage level is less than a threshold voltage.

15. The method of claim 13, further comprising determining if a transistor coupled between a battery and an output node is in a conductive state.

16. The method of claim 13, wherein disabling the battery charger comprises disabling the battery charger if the input current level is less than 50 milliamps and the input voltage level is less than 4.35 volts.

17. The method of claim 13, further comprising initiating a time delay after determining that the input current level is less than the threshold current and the input voltage level is less than the threshold voltage and prior to disabling the battery charger.

18. A method of detecting a reverse-boosting operation upon removal of an input power supply from a battery charger, comprising:
    determining if an input current and an input voltage of the battery charger are less than respective threshold values;
    determining if a transistor selectively coupling an output node of the battery charger to a battery is in a conductive state; and
    disabling the battery charger if the input current and an input voltage are less than the respective threshold values and the transistor is in the conductive state.

19. The method of claim 18, further comprising initiating a time delay after determining that the input current and the input voltage of the battery charger are less than respective threshold values and prior to disabling the battery charger.

20. The method of claim 18, wherein determining if the input current and the input voltage of the battery charger are less than respective threshold values comprises determining if the battery charger is operating in the reverse-boosting operation.

* * * * *